(12) United States Patent
Meckenstock et al.

(10) Patent No.: US 10,589,704 B2
(45) Date of Patent: Mar. 17, 2020

(54) FOOT-SUPPORTING SAFETY DEVICE IN A VEHICLE

(71) Applicant: FORD GLOBAL TECHNOLOGIES, LLC, Dearborn, MI (US)

(72) Inventors: Daniel Meckenstock, Wuppertal NRW (DE); Martin Salz-Breuer, Bonn (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 66 days.

(21) Appl. No.: 16/005,244

(22) Filed: Jun. 11, 2018

(65) Prior Publication Data
US 2018/0361976 A1 Dec. 20, 2018

(30) Foreign Application Priority Data
Jun. 16, 2017 (DE) .................. 10 2017 210 121

(51) Int. Cl.
| | |
|---|---|
| *B60R 21/02* | (2006.01) |
| *B62D 25/20* | (2006.01) |
| *B60N 3/04* | (2006.01) |
| *B60R 21/00* | (2006.01) |
| *B60N 3/06* | (2006.01) |
| *B60R 21/04* | (2006.01) |

(52) U.S. Cl.
CPC .............. *B60R 21/02* (2013.01); *B60N 3/048* (2013.01); *B60N 3/066* (2013.01); *B60R 21/00* (2013.01); *B62D 25/20* (2013.01); *B60R 2021/0004* (2013.01); *B60R 2021/0006* (2013.01); *B60R 2021/0046* (2013.01); *B60R 2021/0053* (2013.01); *B60R 2021/0213* (2013.01); *B60R 2021/0407* (2013.01)

(58) Field of Classification Search
CPC . B60R 21/02; B60R 21/00; B60R 2021/0004; B60R 2021/0006; B60R 2021/0046; B60R 2021/0053; B60R 2021/0213; B60N 3/048; B60D 25/20
See application file for complete search history.

(56) References Cited

U.S. PATENT DOCUMENTS

| | | | | |
|---|---|---|---|---|
| 5,830,163 A | * | 11/1998 | Obermaier | A61H 7/001 |
| | | | | 601/134 |
| 6,161,776 A | * | 12/2000 | Byles | A01G 20/00 |
| | | | | 239/145 |

(Continued)

FOREIGN PATENT DOCUMENTS

| | | |
|---|---|---|
| DE | 20019665 U1 | 1/2001 |
| DE | 102014100501 A1 | 7/2014 |

(Continued)

*Primary Examiner* — Lori L Lyjak
(74) *Attorney, Agent, or Firm* — Frank MacKenzie; Brooks Kushman PC

(57) ABSTRACT

The disclosure relates to a foot-supporting safety device of a motor vehicle. The foot-supporting safety device includes a foot mat, which is provided so as to be arranged on a foot-space floor of the vehicle. The foot mat has a supporting surface and at least one hollow space that receives at least one fluid. The at least one hollow space is arranged in a direction perpendicular with respect to the supporting surface and with a major portion below the supporting surface. In accordance with the disclosure, the at least one hollow space is permanently filled with a predetermined quantity of the at least one fluid.

20 Claims, 4 Drawing Sheets

(56) References Cited

U.S. PATENT DOCUMENTS

| | | |
|---|---|---|
| 6,298,747 B1 | 10/2001 | Sutherland et al. |
| 6,352,281 B1 | 3/2002 | Buss |
| 6,578,867 B2 | 6/2003 | Khoudari et al. |
| 6,685,217 B2 | 2/2004 | Abe |
| 2010/0178450 A1* | 7/2010 | Seifert .................... A47L 23/22 428/100 |
| 2010/0251883 A1 | 10/2010 | Naroditsky |
| 2012/0042460 A1* | 2/2012 | Kessler .................. A47L 23/22 15/97.2 |
| 2014/0050534 A1* | 2/2014 | Thompson .............. F16L 1/123 405/184.4 |
| 2014/0239710 A1* | 8/2014 | Salter ........................ F21S 4/20 307/9.1 |
| 2015/0274114 A1 | 10/2015 | Nagasawa et al. |
| 2016/0016527 A1 | 1/2016 | Aselage et al. |

FOREIGN PATENT DOCUMENTS

| | | |
|---|---|---|
| FR | 2863243 A1 | 6/2005 |
| WO | 2008126095 A1 | 10/2008 |

* cited by examiner

Schnitt A-A'

FOOT-SUPPORTING SAFETY DEVICE IN A VEHICLE

CROSS-REFERENCE TO RELATED APPLICATIONS

This application claims foreign priority benefits under 35 U.S.C. § 119(a)-(d) to DE Application 10 2017 210 121.0 filed Jun. 16, 2017, which is hereby incorporated by reference in its entirety.

TECHNICAL FIELD

The disclosure relates to a foot-supporting safety device in a vehicle.

BACKGROUND

It is known in the field of automotive technology that when vehicles are involved in a frontal or side-frontal impact, a vehicle driver frequently suffers injuries to his foot and/or to his legs. By way of example, a combined movement of a rotation of the foot and a supporting movement during an impact may cause foot fractures. Moreover, injuries are known that are caused by pedals in a vehicle acting upon feet of the vehicle driver.

It is proposed in many variations to use inflatable airbags that are arranged in particular in a foot space and inflated in an event of an impact.

By way of example U.S. Pat. No. 6,352,281 B1 describes a device that, in the event of the foot space becoming deformed as a result of an impact, reduces a risk of injury to a foot and leg region of a person who is sitting on a seat that is arranged inside a vehicle. The foot space is cladded with a floor covering that is made from an acoustic-damping layer and a carpet lying on top of said layer. The device comprises a foot cushion that is allocated to the foot space. In response to a trigger signal, at least one gas generator that is allocated to the foot cushion introduces gas suddenly into the foot cushion, wherein the foot cushion fills the relevant foot space temporarily with predetermined dimensions prior to a firewall penetrating a vehicle interior compartment. The foot cushion is formed between the acoustic-damping layer and the carpet of the floor covering, wherein gas from the gas generator is introduced into a space between the acoustic-damping layer and the carpet, and the carpet is only fixed in regions to the acoustic-damping layer in a region of the foot cushion that is to be formed.

Moreover, U.S. Pat. No. 6,578,867 B2 discloses an inflatable protection system for use in a vehicle so as to protect lower extremities of a vehicle occupant. The protective system comprises an expandable casing that is adapted for mounting over a floor surface of a transport vehicle below a foot of a vehicle occupant. If a triggering event, for example a deceleration that exceeds a specific level, occurs during operation of the vehicle, an inflating device releases airbag inflation gas for introduction into the inflatable casing. The casing is able to expand outwards from a floor area, which lies below the casing, and generally in a direction of the foot of the occupant so as to engage with the foot during a sudden deceleration event, as a result of which an extended supporting contact is created for the foot during the sudden deceleration event.

US 2015/0274114 A1 discloses an airbag device in a vehicle for reliably preventing injury to legs of a seated person as a result of an axial loading caused by a forward and rearward shunt of the vehicle at a point in time of a vehicle impact.

The airbag device comprises an airbag body that inflates and unfolds between a foot of a seated person and a base plate. At the point in time of a impact, the inflating device is activated when a signal is received from an acceleration sensor, and as a result of this activation an airbag body is inflated and unfolded. The airbag body comprises a rear inflation section that may be inflated from a heel of a seated person rearward and upward higher than a floor area of a foot in an inflating and unfolding form of the airbag body, and said airbag body also comprises a front inflation section that may be inflated from a toe of the seated person forward and upward higher than a lower face of the foot in the inflating and unfolding form of the airbag body.

US 2016/0016527 A1 further describes an inflatable heel blocker that is provided so as to protect feet, heels and lower legs of a driver of a motor vehicle in an event of an impact. A heel blocker comprises an inflatable membrane having a first section that is fastened to a planar floor panel adjacent to a firewall and under vehicle pedals. In an event of an impact, the inflatable membrane unfolds in one region that is defined by a floor of the vehicle pedals, the firewall and the floor panel. It is important that during the unfolding procedure a rearmost and lowermost part of the membrane is secured to the floor panel, as a result of which an efficacy of the device is maximized.

U.S. Pat. No. 6,685,217 B2 proposes a leg-protecting device for protecting legs of a vehicle occupant prior to an impact, said leg-protecting device having a vehicle component that is located in front of the vehicle occupant. The leg-protecting device comprises an airbag that is installed within the vehicle component, and a gas generator for generating gas so as to inflate the airbag. The airbag comprises a first chamber having a first gas inlet, and a second chamber having a second gas inlet. The airbag expands along the vehicle component, in particular in parallel with the legs of the vehicle occupant, if the airbag is inflated as a result of the gas generator being activated in the event of an impact. The first chamber and the second chamber are connected in such a manner that the gas that is generated by the gas generator initially passes through the first chamber and subsequently flows into the second chamber.

US 2010/0251883 A1 describes a safety device for providing protection against an explosion, in particular for use in an armored vehicle. The safety device is provided as a floor mat that is configured so as to be used under normal conditions as a floor mat and is used as an energy-absorbing safety device for providing protection against an explosion that may exert a certain pressure force on said safety device. The floor mat consists of a perforated material layer of foam and/or gel or soft rubber.

Even though known safety and protection devices fulfill their function, the field of protection devices that protect feet and/or legs of vehicle occupants as disclosed in the described prior art still requires improvements with respect to a simplified structural construction and protective function, since airbags that are inflated in an event of an impact may form a suddenly occurring, mechanical counteracting force that expands in a direction of the feet of the vehicle occupant.

SUMMARY

The object of the disclosure is to provide a protective device that protects feet and/or legs of vehicle occupants in an event of an impact, and said device is to comprise a simplified structural design and avoid formation of a suddenly occurring, mechanical counteracting force in the event of an impact.

It is to be noted that features and measures that are described individually in the following description may be combined in any random, technically expedient manner with one another and form further embodiments of the disclosure. The description characterizes and specifies the disclosure in particular in connection with the Figures.

The foot-supporting safety device in accordance with the disclosure for use in a vehicle comprises a foot mat that is provided so as to be arranged on a foot-space floor of a vehicle, and at least one supporting surface that securely supports feet of a vehicle occupant and at least one hollow space that receives at least one fluid. The at least one hollow space is arranged in a direction perpendicular to the supporting surface and with a major portion below the supporting surface. The at least one hollow space is thus permanently filled with a predetermined quantity of the at least one fluid.

The term a "vehicle" is to be understood in the terms of this disclosure to mean a passenger vehicle, a commercial vehicle or a bus or coach. The term "foot-space floor" is to be understood in the terms of this disclosure to include both a part of a floor panel that is provided to support feet of a vehicle occupant, and also a part of a firewall of the vehicle that is adjacent to the floor panel. The term "provided so as to" is to be understood in the terms of this disclosure to mean 'designed or arranged in particular especially to . . . '. The term "with a major portion" is to be understood in terms of the disclosure to mean a portion of more than 50%.

One advantage of the foot-supporting device in accordance with the disclosure resides in the fact that in an event of an impact, by which a sudden force acts on feet of a vehicle occupant, it is possible to reduce a maximum amount of force that acts on the feet of the vehicle occupant, in that a time interval until the feet cease to move is increased by yielding fluid in the at least one hollow space.

Furthermore, it is possible to avoid a suddenly occurring mechanical counteracting force that in addition expands in a direction of the feet of the vehicle occupant. It is possible, with the foot-supporting safety device in accordance with the disclosure, to comply more easily with existing safety regulations and agreements, by way of example such regulations and agreements that are part of the New Car Assessment Program (NCAP) issued by the civil US Federal Authority for Road and Vehicle Safety (National Highway Traffic Safety Administration (NHTSA)).

A further advantage of the foot-supporting safety device in accordance with the disclosure resides in a simplified structural design, namely in that it is possible to reduce a force that acts on the feet of the vehicle occupant in the event of an impact without having to provide a gas generator or to provide supply lines between the gas generator and the hollow space. As a consequence, a foot-supporting safety device is provided that in particular does not require as many parts and saves costs.

In addition, the foot-supporting safety device in accordance with the disclosure has a noise-damping effect with respect to engine and travel noises that occur during a normal drive.

The foot-supporting safety device in accordance with the disclosure is easily accessible and, in an appropriate embodiment, may be advantageously retrofitted or exchanged in existing vehicles in a simple manner.

In a preferred embodiment of the foot-supporting safety device, the at least one hollow space is filled with predetermined quantities of at least two different fluids. If the at least one hollow space contains, by way of example, predetermined quantities of a liquid fluid and a gaseous fluid, it is possible to provide an expanded scope of interpretation for possible deforming characteristics of the foot-supporting safety device.

It is preferred that the fluid or fluids are formed by a gas or a gel. It is possible, by using a gas, to rapidly reduce a force that acts on the feet of the vehicle occupant in the event of an impact. It is possible, by using a gel, to avoid undesired sloshing noises and provide a particularly good sound insulation with respect to engine and/or drive noises.

It is possible to vary dimensions of the at least one hollow space in a direction perpendicular to a supporting surface, in other words a foot mat may be thicker than is actually necessary to comply with the safety requirements, in order to realize improved sound insulation characteristics so as to increase drive comfort, by way of example for passenger cars in a high price sector. A thickness of the foot mat is preferably in a range of one to multiple centimeters.

In preferred embodiments of the foot-supporting safety device, at least one passive over-pressure valve is provided so as to produce a fluid-flow connection between the at least one hollow space and an environment outside the at least one hollow space in an event that a predetermined threshold value is achieved or exceeded for a force that is exerted, via the supporting surface, on the at least one fluid. By virtue of suitably selecting the predetermined threshold value, it is possible, by reducing a quantity of fluid that is stored in the at least one hollow space, to avoid a rebound of the feet of the vehicle occupant in the event of an impact and to further reduce a maximum magnitude of force that acts on the feet of the vehicle occupant.

It is preferred that the predetermined threshold value for the force that is exerted, via the supporting surface, on the at least one fluid is in a range lying between a lower force value, which corresponds to a maximum foot pedal force that may be exerted by an average driver, and an upper force value, which is fixed in a predetermined spacing below a level of force that in all probability causes a fracture of a bone in a foot or ankle of a vehicle driver. The lower force value may correspond by way of example to 95% percentile of an empirically ascertained, maximum foot pedal force that may be exerted by male vehicle drivers. Fluid is not to pass from the at least one hollow space into the environment outside the at least one hollow space as a result of normal loading when the vehicle is in use.

Likewise, the force level may be determined in all probability for a foot bone fracture by the 5% percentile of the force values that are estimated from impact data and have caused a fracture of a foot bone of female drivers. Data of this type is available by way of example from a database of a GIDAS ("German In-depth Accident Study") project. The force level in all probability for a foot bone fracture may also be adjusted in dependence upon updated reports for the EURO NCAP ("European New Car Assessment Programme"), USNCAP etc. according to a desired or recommended counteracting force/rigidity in order to realize a best possible number of points.

If the foot mat of the foot-supporting safety device comprises more than one hollow space, the predetermined threshold value for the force that is exerted via the supporting surface on the fluid in the respective hollow space is selected to be proportional to an area portion of the supporting surface that is acting on the fluid in a relevant hollow space. It is possible by virtue of a predetermined threshold value that is selected in this range to tolerate a loading caused by the vehicle occupant, such a loading may occur as a result of the vehicle occupant supporting himself on the at least one hollow space in order to remove an object from a trouser pocket. A force that is exerted via the supporting surface on the at least one fluid by the vehicle occupant operating the pedals is generally below this force range. A predetermined threshold value that is selected in the range may simultaneously ensure that the maximum force that acts upon the feet of the vehicle occupant in the event of an impact is reduced sufficiently to avoid bone fractures.

In preferred embodiments of the foot-supporting safety device, at least one controllable valve is provided to produce a fluid-flow connection between the at least one hollow space and an environment outside the at least one hollow space. As a consequence, it is possible to actively use an impact that is detected by other systems in the vehicle so as to reduce a quantity of fluid that is contained in the at least one hollow space by controlling the controllable valve in order to avoid, to a great extent, a rebound of the feet of the vehicle occupant and reduce a maximum magnitude of force that is acting on the feet of the vehicle occupant. Furthermore, it is possible in an advantageous manner to adjust a counteracting force, which is provided by the foot-supporting safety device, by being able to configure a progression with respect to time of the reduction in the quantity of fluid that is contained in the at least one hollow space.

It is preferred that at least one fastener to fasten the foot-supporting safety device, directly or indirectly, to the foot-space floor of the vehicle is provided, as a result of which it is possible to avoid a relative position of the foot mat being displaced with respect to the foot-space floor, and ensure that the feet of the vehicle occupant are held securely on the foot mat during a normal drive. If the foot-supporting safety device is fastened directly to the foot-space floor, the foot-supporting device may be fastened, by way of example, by the at least one fastener to a cover material of the floor panel, said fastening means being fixedly attached to the floor panel, by way of example with an adhesive.

In preferred embodiments, the at least one fastener of the foot-supporting safety device is configured as a positive-locking element. By way of example, the positive locking element may be formed by a circular hole in a portion of a base area of the foot mat that is not covered by the at least one hollow space, and said positive-locking element is provided so as to form a positive-locking connection with a corresponding, spigot-shaped, positive-locking element that is fixedly attached to a cover material of the floor plate. Alternatively or in addition thereto, the at least one fastener that is configured as a positive-locking element may be formed by a hook and loop fastener that is provided so as to form a multiplicity of positive-locking connections with a corresponding hook and loop fastener that is attached to the cover material of the floor panel, or attached directly to the floor panel.

It is possible in an advantageous manner to provide the at least one fastener, which is configured as a positive-locking element, in addition with a latching connection element, which renders it possible to provide a particularly efficient protection against a relative position of the foot mat being displaced with respect to the foot-space floor.

In preferred embodiments of the foot-supporting safety device, a base area of the foot mat is configured in such a manner that the foot mat is provided so as to form a positive-locking connection that is effective at least in a drive direction with a front portion of the foot-space floor of the vehicle, as a result of which it is possible to provide effective protection against a relative position of the foot mat being displaced with respect to the foot-space floor in the drive direction. It is particularly preferred that as a result of a design of the base area, it is possible to form the positive-locking connection that is effective in the drive direction, and, in addition, form positive-locking connections that are effective in a transverse manner with respect to the drive direction, as a result of which it is also possible to ensure protection against the foot mat becoming displaced in a transverse manner with respect to the drive direction.

If a surface of the foot mat that is remote from the foot-space floor of vehicle is configured as a carpet, it is possible to integrate the foot-supporting safety device into an interior compartment of the vehicle in a particularly simple manner with a small material outlay.

Further advantageous embodiments of the disclosure are disclosed in the following description of the figures. In the drawings:

DETAILED DESCRIPTION

Figure 1:
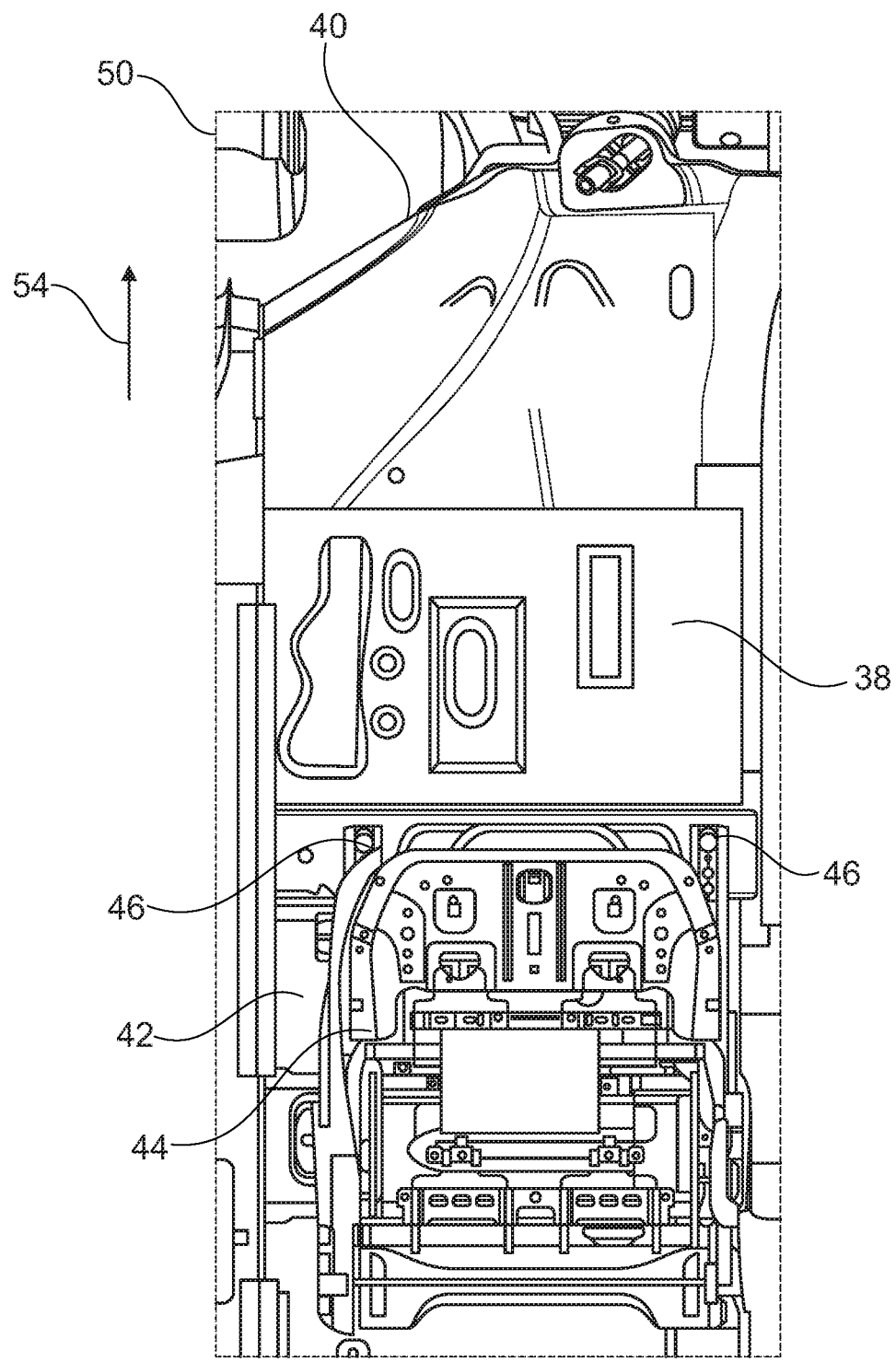
FIG. 1 illustrates a schematic plan view of a driver side of an interior compartment of a left-hand drive vehicle that is configured as a passenger car.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Like parts in the different Figures are always provided with the same reference numeral and for this reason said parts are generally only described once.

FIG. 1 illustrates a plan view of a driver side of an interior compartment of a left-hand drive vehicle that is configured as a passenger vehicle. FIG. 1 illustrates a normal drive direction 54 of the vehicle towards an upper edge of the page. The interior compartment of the vehicle is delimited by a floor panel 42 in a direction towards a surface being driven. A seat floor 44 of a vehicle seat (not shown) is mounted on the floor panel 42 in a manner known per se so as to be displaceable on two rails 46 that are oriented in the drive direction 54. When viewed in the drive direction 54 in front of the seat floor 44, the floor panel 42 forms a foot-space floor 38 and a front portion of said foot-space floor 38 adjoins a firewall 40. A left-hand front wheel 56 of the vehicle is illustrated in part so as to improve explanation. Pedals are generally provided in a transition region between the foot-space floor 38 and the firewall 40, but said pedals are not illustrated in FIG. 1 for clarity.

The floor panel 42 is provided in the region of the foot-space floor 38 including an inner face of the firewall 40 with a light textile covering (not illustrated) that is fixed to the floor panel 42.

Figure 2:
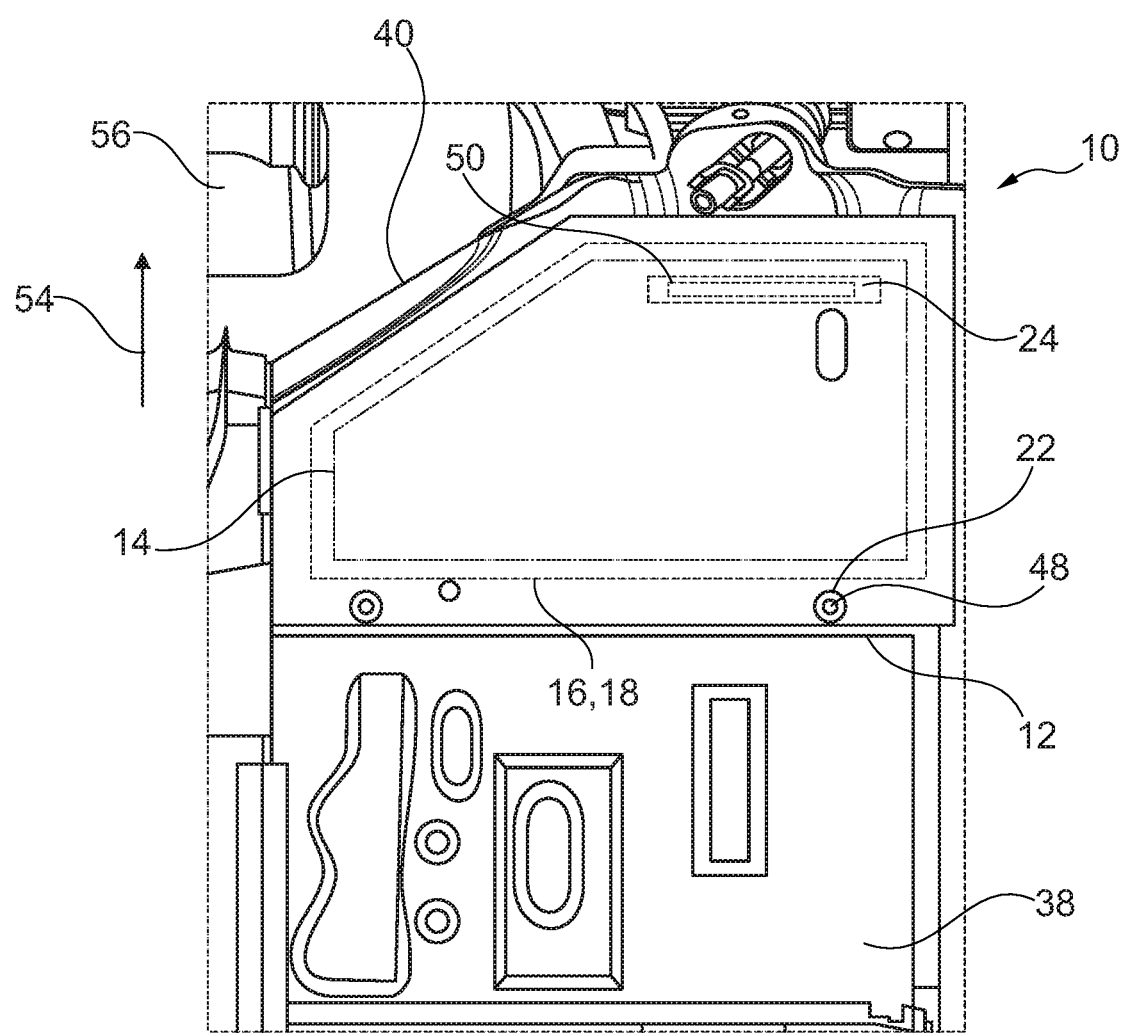
FIG. 2 illustrates one possible embodiment of a foot-supporting safety device in accordance with the disclosure and installed in the vehicle as shown in FIG. 1.

FIG. 2 illustrates one possible embodiment of a foot-supporting safety device 10 in accordance with the disclosure in a state installed in the vehicle as shown in FIG. 1.

The foot-supporting safety device 10 comprises a foot mat 12 that is provided so as to be arranged on the foot-space floor 38 of the vehicle. The foot mat 12 comprises a base area that corresponds essentially to a rectangular shape with a chamfered left-hand, front corner, wherein a width of the base area in a transverse manner with respect to the drive direction 54 corresponds to a shape of the chamfered shape of the foot-space floor 38. In this manner, the foot mat 12 is provided so as to form effective positive-locking connections with a front portion of the foot-space floor 38 of the vehicle, both in the drive direction 54 and also in a transverse manner with respect to the drive direction 54 in order to prevent a position of the foot mat 12 being displaced relative to the foot-space floor 38 outside predetermined tolerances of the base area of the foot mat 12.

Furthermore, the foot mat 12 comprises a supporting surface 14 that securely supports feet of a vehicle occupant.

In order to additionally fix the foot-supporting safety device 10 to the foot-space floor 38, the foot mat 12 is provided on an end that faces a driver seat with two fasteners 22 that are configured as a positive-locking element, said fasteners being configured in each case as a circular hole in the floor mat 12, said circular holes being reinforced by a synthetic material ring and arranged outside the supporting surface 14. Positive-locking elements that correspond to the synthetic material rings are fixedly attached in the form of circular, synthetic material spigots 48 on the textile covering of the foot-space floor 38. It is possible, by virtue of mutually corresponding latching protrusions (not illustrated) that are attached to the synthetic material rings and the circular spigots 48, for the positive-locking connection to be additionally latched in order to prevent a position of the foot mat 12 becoming displaced relative to the foot-space floor 38 outside predetermined tolerances.

Moreover, a hook and loop fastener 24 is attached to a lower face of the foot mat 12 at an end that is remote from the driver seat, and said hook and loop fastener corresponds to a further hook and loop fastener 50 that is fixedly attached to the textile covering of the foot-space floor 38.

Figure 3:
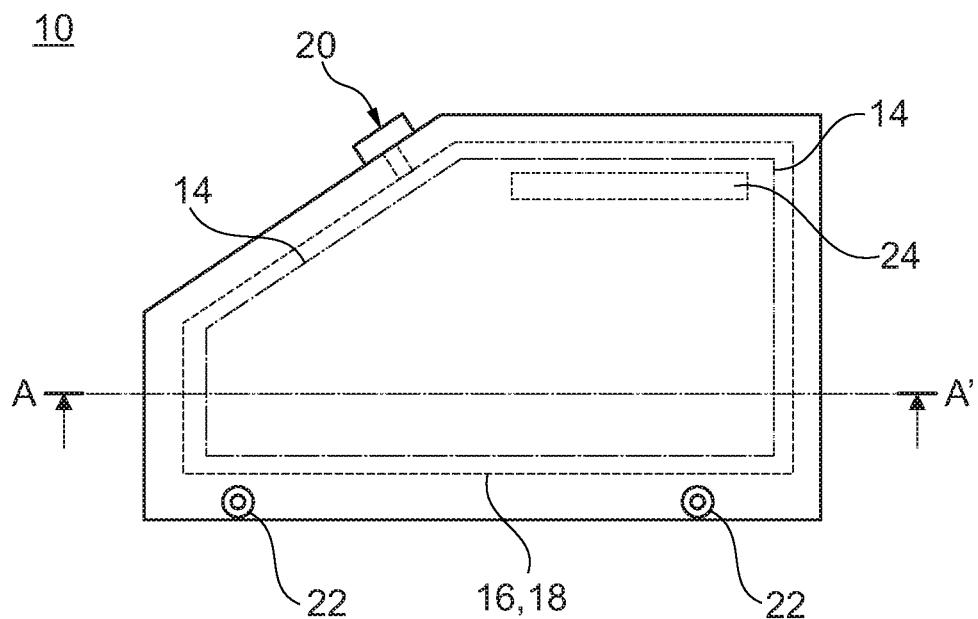
FIG. 3 illustrates a schematic plan view and a sectional view of the embodiment of the foot-supporting safety device in accordance with the disclosure as shown in FIG. 2.
Figure 3:
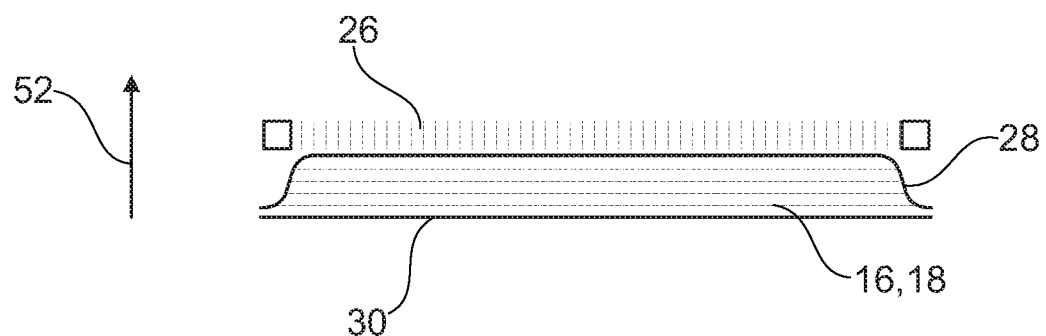

As is apparent in FIG. 3, the foot mat 12 is configured with multiple layers. One surface of the foot mat 12 that is facing the vehicle occupant is configured as a carpet 26 that corresponds to a carpet 26 that is laid on a remaining surface of the foot-space floor 38 on the textile covering with the result that it is possible to integrate the foot-supporting safety device 10 easily into the interior compartment of the vehicle. A flexible, upper fluid-tight layer 28 that is remote from the foot-space floor 38 and a flexible, lower fluid-tight layer 30 that is facing the foot-space floor 38 are arranged below a surface that is configured as a carpet 26. The foot mat 12 comprises a hollow space 16 between the upper fluid-tight layer 28 and the lower fluid-tight layer 30 so as to permanently receive a fluid 18.

The two fasteners 22 that are configured as a positive-locking element are arranged in a direction 52 perpendicular to the foot-space floor 38 outside the supporting surface 14. The hollow space 16 is arranged in the direction 52 perpendicular to the supporting surface 14 and with a major portion below the supporting surface 14. Conversely expressed, the hollow space 16 completely covers the supporting surface 14 in the direction 52 perpendicular to the supporting surface 14. In this arrangement, the vehicle occupant exerts a force that changes with respect to time on the hollow space 16 by virtue of operating the pedals and changing supporting behavior with feet with respect to time.

The hollow space 16 of the foot mat 12 is permanently filled with a predetermined quantity of the fluid 18 that is preferably formed as a gel. A passive overpressure valve 20 is arranged at an edge of the hollow space 16 of the foot mat 12. The passive overpressure valve 20 is provided so as to produce a fluid-flow connection between the hollow space 16 and an environment outside the hollow space 16 in an event that a predetermined threshold value is achieved or exceeded for a force that is exerted via the supporting surface 14 on the fluid 18.

The predetermined threshold value for the force that is exerted via the supporting surface 14 on the fluid 18 lies in a range between a lower force value, which corresponds to a 95% percentile of an empirically ascertained, maximum foot pedal force that may be exerted by male vehicle drivers, and an upper force value, which is fixed in a predetermined interval below a force level that corresponds to a 5% percentile of force values that are estimated from impact data and have caused a fracture of a foot bone of female drivers.

The predetermined threshold value lies above a force that is generally exerted on the foot mat 12 by a vehicle occupant when operating the pedals, and above a force that is exerted on the foot mat 12 by the vehicle occupant while entering or leaving the vehicle, and/or a case that the vehicle occupant presses against the foot mat 12 in order to remove an object (not shown) from a trouser pocket (not shown).

On the other hand, the predetermined threshold value is clearly below a force that is required to cause a fracture of a foot or lower leg. However, it is also possible to select said threshold value in a purposeful manner to be even lower in order to achieve rigidity values that correspond to an evaluation or points score in already mentioned public domain test reports for "lower leg" and "foot" values, and said threshold value may thus be adjusted to suit individual needs of different requirements.

Once the fluid-flow connection has been produced between the hollow space 16 and the environment outside the hollow space 16, the hollow space 16 that is storing the fluid is emptied in part and the feet of the vehicle occupant are pushed against flow resistance of the passive overpressure valve 20 deeper into the foot mat 12. In so doing, flow resistance acts in a damping manner on movement of the feet of the vehicle occupant, with a result that the foot mat 12 of the foot-supporting safety device 10 is used as a passive, counteracting force with a damping effect on movement of the feet of the vehicle occupant.

In this embodiment, the hollow space 16 is filled with a predetermined quantity of the fluid 18 that is preferably formed as a gel. In alternative embodiments, the hollow space may be filled with predetermined quantities of different fluids, by way of example a fluid and a gas, as a result makes it possible to change a progression with respect to time of movement of the feet of the vehicle occupant in a direction towards the foot mat.

Figure 4:
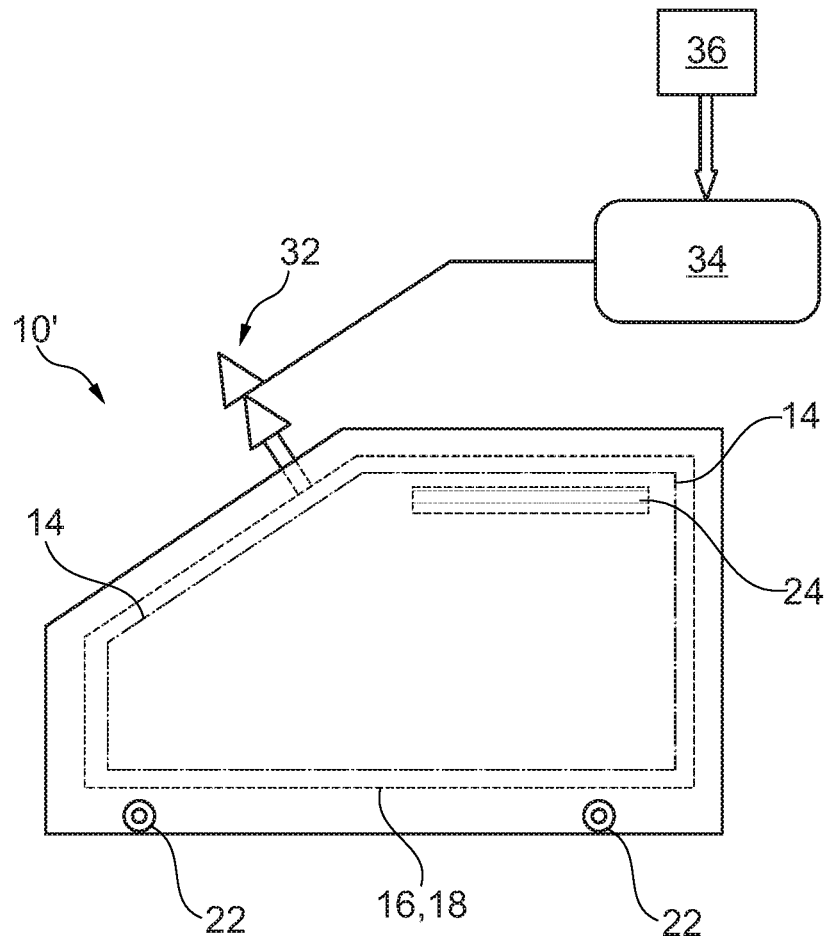
FIG. 4 illustrates a schematic plan view of an alternative embodiment of the foot-supporting safety device in accordance with the disclosure.

The passive overpressure valve 20 that is described in this exemplary embodiment may be replaced in an alternative embodiment of the foot-supporting safety device 10' by a controllable valve 32 that is provided so as to produce a fluid-flow connection between the at least one hollow space 16 and an environment outside the at least one hollow space 16. An arrangement of this type is illustrated in FIG. 4.

A vehicle control device 34 that may be a component of an electronically controlled driver assist system that provides stability control ("Electronic Stability Control," or "ESC") or a central control unit is provided inter alia so as, when an impact is detected by an acceleration sensor 36, to control the controllable valve 32 so as to adjust a predetermined flow resistance of the valve 32. In this manner, the damping characteristics of the foot mat 12 that is acting as a counter bearing may be realized in a particularly flexible manner, and, in particular, in dependence upon parameters that have been detected by the ESC system.

Naturally, the disclosure is not limited to the described left-hand drive vehicles, but may also be adjusted to suit right-hand drive vehicles. It is possible to provide each foot space 38 of the vehicle with a foot mat 12 in accordance with the disclosure.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A foot-supporting safety device of a vehicle, comprising:
   a foot mat arranged on a foot-space floor of the vehicle, including
      a supporting surface that securely supports feet of an occupant, and
      a hollow space permanently filled with a fluid, arranged in a direction perpendicular with respect to the supporting surface and with a portion below the supporting surface.

2. The foot-supporting safety device as claimed in claim 1, wherein the hollow space is filled with two different fluids.

3. The foot-supporting safety device as claimed in claim 1, wherein the fluid is a gas or gel.

4. The foot-supporting safety device as claimed in claim 1 further comprising a passive overpressure valve provided to produce a fluid-flow connection between the hollow space and the outside of the hollow space if a predetermined threshold value is achieved or exceeded by a force exerted, via the supporting surface, on the fluid.

5. The foot-supporting safety device as claimed in claim 4, wherein that the predetermined threshold value is between a maximum foot pedal force that may be exerted by an average driver, and a predetermined interval below a level of force that causes a fracture of a bone in a foot.

6. The foot-supporting safety device as claimed in claim 1 further comprising a controllable valve to produce a fluid-flow connection between the hollow space and outside the hollow space.

7. The foot-supporting safety device as claimed in claim 1 further comprising a fastener to fasten the foot mat to the foot-space floor of the vehicle.

8. The foot-supporting safety device as claimed in claim 7, wherein the fastener is configured as a positive-locking element.

9. The foot-supporting safety device as claimed in claim 1, wherein the foot mat includes a base area configured such that the foot mat forms a positive-locking connection that is effective at least in a drive direction with a front portion of the foot-space floor of the vehicle.

10. The foot-supporting safety device as claimed in claim 1, wherein the foot mat has a carpeted surface that is remote from the foot-space floor of the vehicle.

11. A vehicle comprising:
    a floor defining a foot-space for an occupant;
    a mat arranged in the foot-space on the floor; and
    a hollow space that receives a fluid, arranged in a direction perpendicular with respect to the mat and with a portion below the mat, permanently filled with the fluid.

12. The vehicle as claimed in claim 11, wherein the hollow space is filled two different fluids.

13. The vehicle as claimed in claim 11 further comprising a passive overpressure valve provided to produce a fluid-flow connection between the hollow space and the outside of the hollow space if a predetermined threshold value is achieved or exceeded by a force exerted, via the mat, on the fluid.

14. The vehicle as claimed in claim 11 further comprising a controllable valve to produce a fluid-flow connection between the hollow space and the outside of the hollow space.

15. The vehicle as claimed in claim 11 wherein the mat includes a base area that forms a positive-locking connection in a drive direction with a front portion of the foot-space.

16. A vehicle floor comprising:
    a mat arranged in a foot-space that includes a surface that securely supports feet of an occupant; and
    a hollow space that receives a fluid, arranged in a direction perpendicular to the surface and with a portion below the surface, wherein the hollow space is permanently filled with at least two fluids.

17. The vehicle floor as claimed in claim 16, wherein the surface of the foot mat is a carpet.

18. The vehicle floor as claimed in claim 16 further comprising a passive overpressure valve provided to produce a fluid-flow connection between the hollow space and the outside of the hollow space if a predetermined threshold value is achieved or exceeded by a force exerted, via the surface, on the fluid.

19. The vehicle floor as claimed in claim 16 further comprising a controllable valve to produce a fluid-flow connection between the hollow space and the outside of the hollow space.

20. The vehicle floor as claimed in claim 16, wherein the foot mat includes a base area that forms a positive-locking connection in a drive direction with a front portion of the foot-space.

* * * * *